United States Patent [19]

Yamaguchi

[11] Patent Number: 5,216,938
[45] Date of Patent: Jun. 8, 1993

[54] CONTROL APPARATUS WITH FAIL-SAFE FACULTY

[75] Inventor: Hiroshi Yamaguchi, Yokohama, Japan

[73] Assignee: Nissan, Yokohama, Japan

[21] Appl. No.: 676,406

[22] Filed: Mar. 28, 1991

[30] Foreign Application Priority Data

| Mar. 28, 1990 | [JP] | Japan | 2-76693 |
| Mar. 28, 1990 | [JP] | Japan | 2-76694 |
| Mar. 28, 1990 | [JP] | Japan | 2-76695 |

[51] Int. Cl.$^5$ ............................................. G05D 17/02
[52] U.S. Cl. ...................................... 74/866; 74/867; 364/424.1; 364/426.01; 364/431.01; 364/131; 371/68.1; 371/68.3
[58] Field of Search ............... 74/866, 867; 364/424.1, 364/426.01, 426.02, 426.03, 426.04, 431.01, 431.03, 431.04, 431.11, 131, 133; 371/68.1, 68.3

[56] References Cited

U.S. PATENT DOCUMENTS

| 4,310,889 | 1/1982 | Imai et al. | 364/431.04 |
| 4,327,437 | 4/1982 | Gelderloos | 371/68 |
| 4,358,823 | 11/1982 | McDonald et al. | 364/200 |
| 4,523,281 | 6/1985 | Noda et al. | 192/3.54 |
| 4,622,667 | 11/1986 | Yount | 371/9 |
| 4,667,541 | 5/1987 | Shimaoka et al. | 74/866 |
| 4,747,056 | 5/1988 | Yamamoto et al. | 74/866 X |
| 4,819,187 | 4/1989 | Yasue et al. | 364/431.01 |
| 4,833,613 | 5/1989 | Mack et al. | 74/866 X |
| 4,838,124 | 6/1989 | Hamano et al. | 74/866 |
| 4,849,893 | 7/1989 | Page et al. | 364/434 |
| 4,849,899 | 7/1989 | Cote et al. | 74/866 X |
| 4,918,606 | 4/1990 | Ito et al. | 364/424.1 |
| 4,955,256 | 9/1990 | Kashihara et al. | 364/424.1 X |
| 4,969,099 | 11/1990 | Iwatsuki et al. | 364/424.1 X |
| 5,016,494 | 5/1991 | Yamaguchi | 74/866 X |
| 5,047,944 | 9/1991 | Ishikawa et al. | 364/431.11 |

FOREIGN PATENT DOCUMENTS 0241216 10/1987 United Kingdom .
0242086 10/1987 United Kingdom .
0243022 10/1987 United Kingdom .

Primary Examiner—Allan D. Herrmann
Assistant Examiner—William O. Trousdell
Attorney, Agent, or Firm—Pennie & Edmonds

[57] ABSTRACT

In a control apparatus with fail-safe faculty for controlling an output torque of a vehicle including an electronically controlled fuel-injection type engine and an automatic transmission having a torque converter and a speed change gear mechanism, in which when an abnormal start operation causing a racing select shock is detected, an output torque of the engine is reduced by stopping a supply of a fuel to all or half cylinders of the engine in dependent upon the engine running speed, a clutch transfer torque capacity is reduced by reducing a line pressure of the speed change gear mechanism, and a gear position of the speed change gear mechanism is shifted into a second gear position, the improvements being characterized in that when a system failure in which one of sensors and actuators becomes out of order or a communication line between an engine control computer and a transmission control computer becomes out of order occurs, the reduction of the engine output torque is performed upon the abnormal start operation without fail. Further, one of the reduction of the clutch transfer torque capacity and the shift of the gear position into the second gear position, which may be conducted without being affected by the system failure is performed. In a preferable embodiment, upon the system failure, the fuel supply to a larger number of cylinders is stopped, the clutch transfer torque capacity is reduced to a larger extent and the gear position is shifted into a third gear position in response to the abnormal start operation.

23 Claims, 12 Drawing Sheets

FIG_6

FIG_8
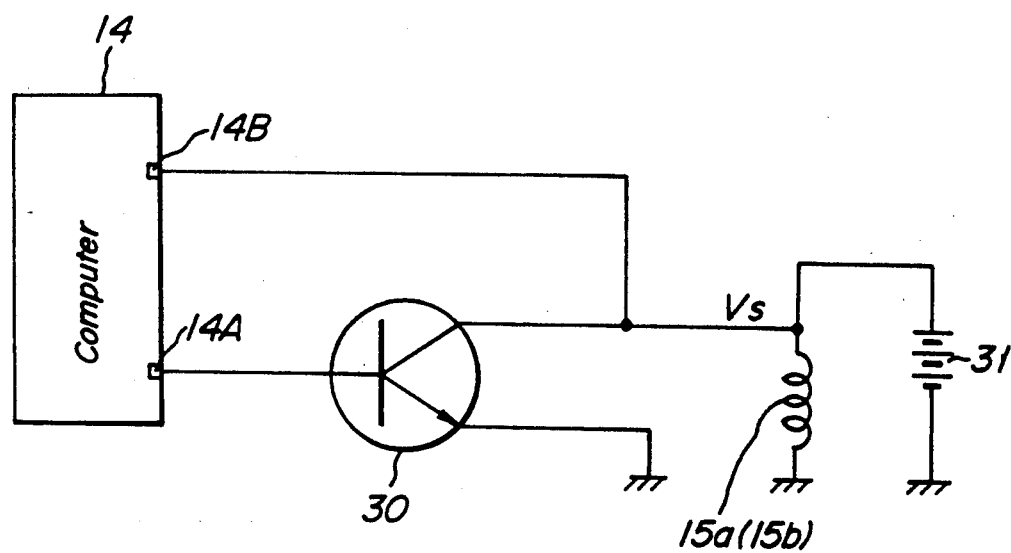

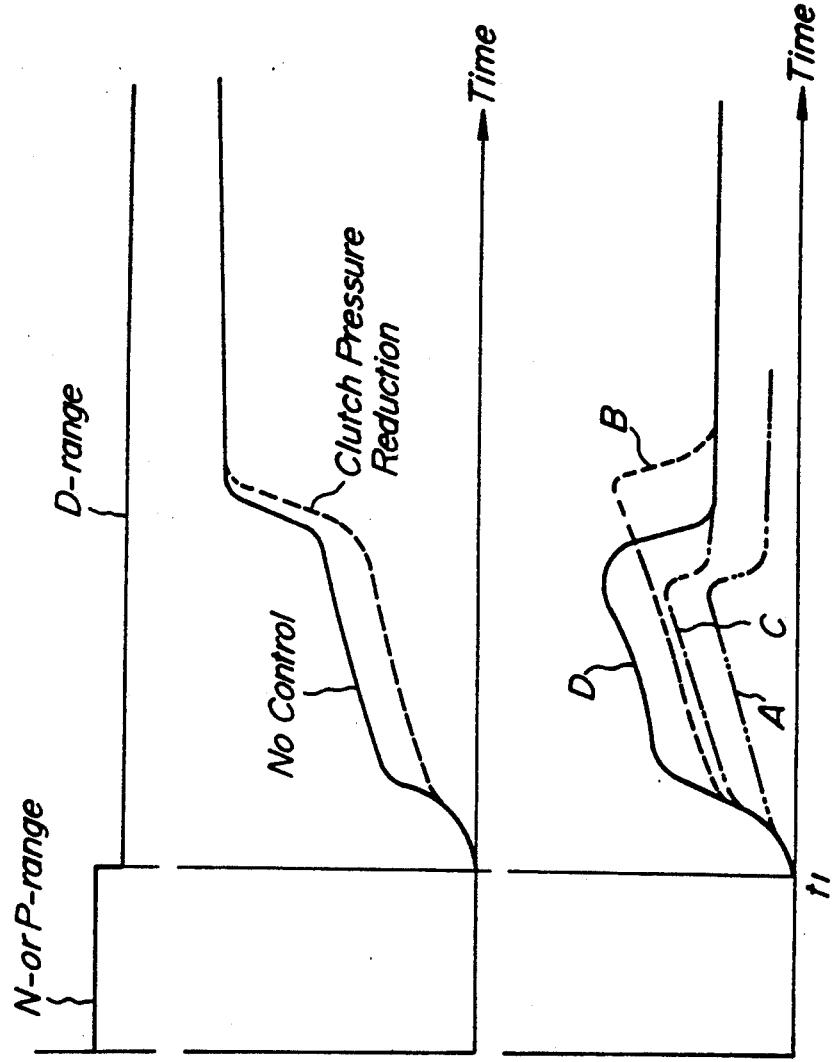

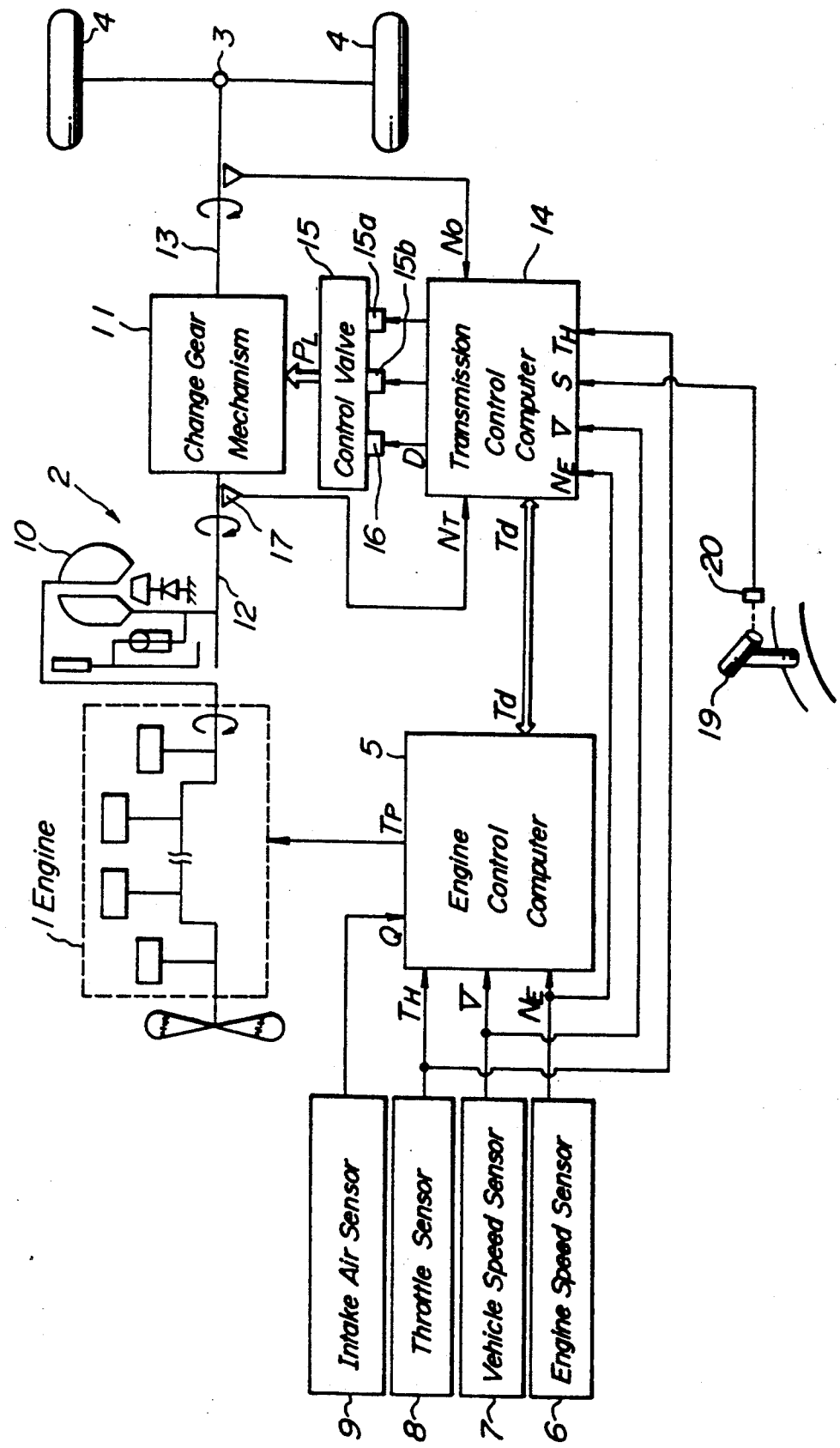

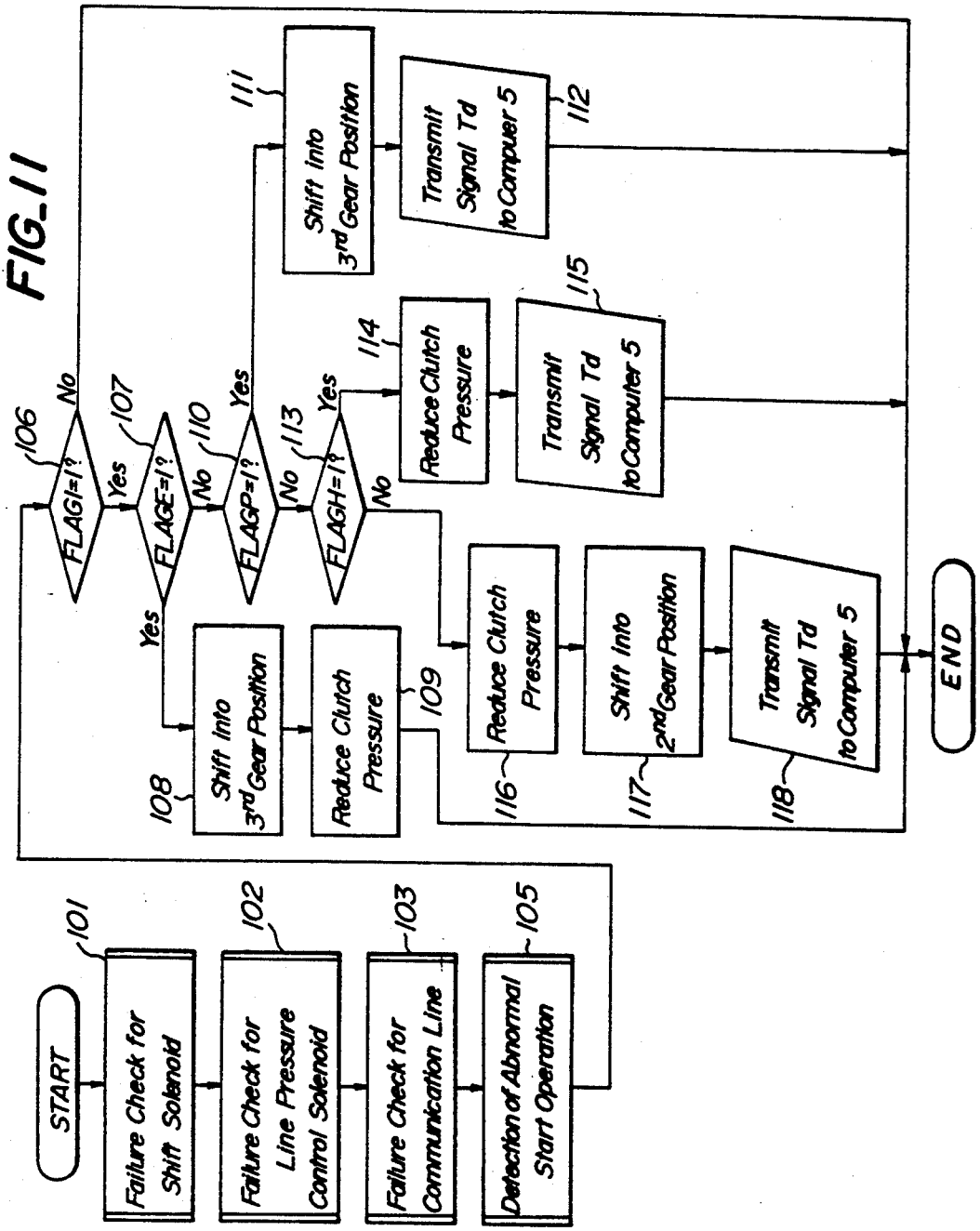

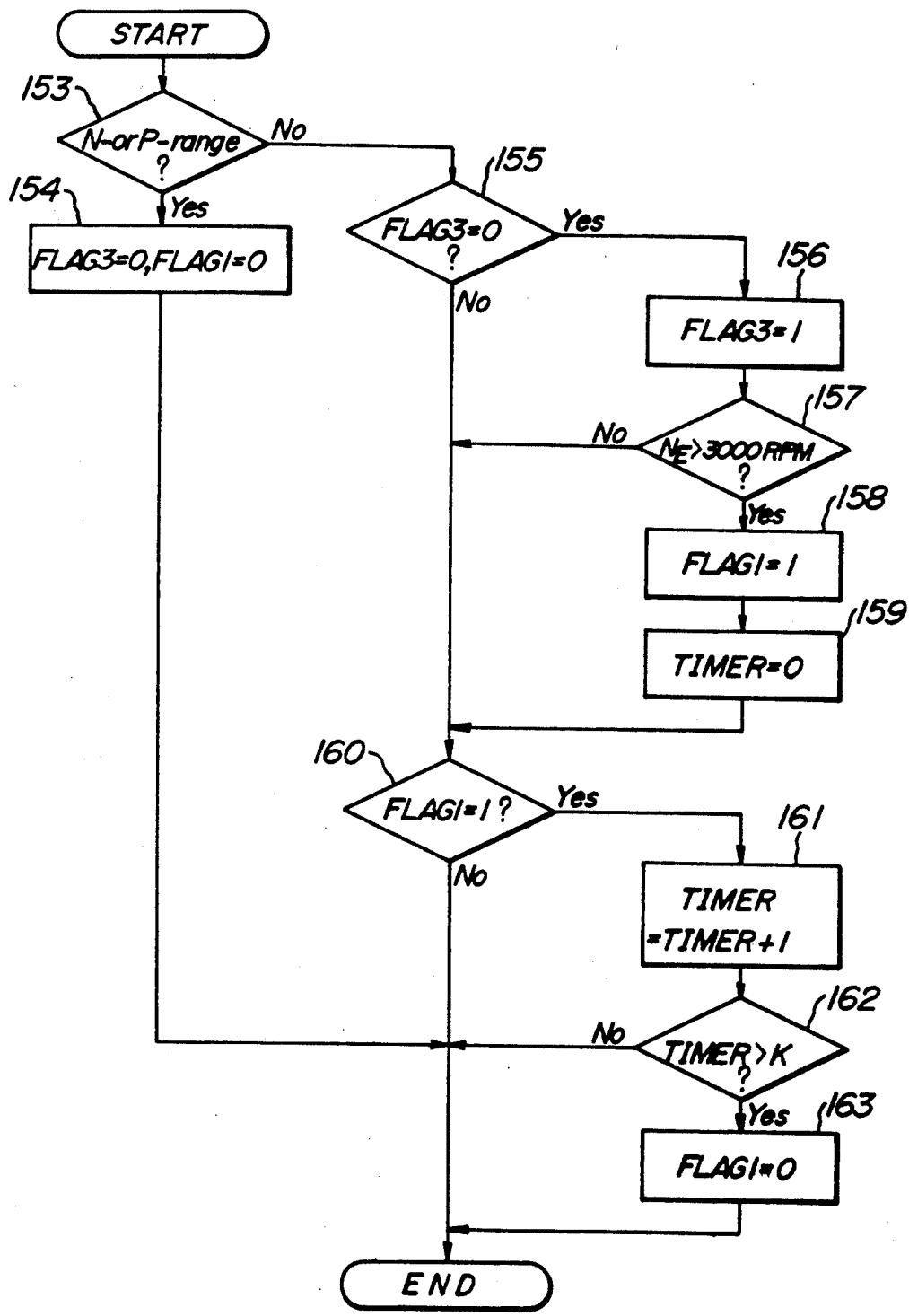

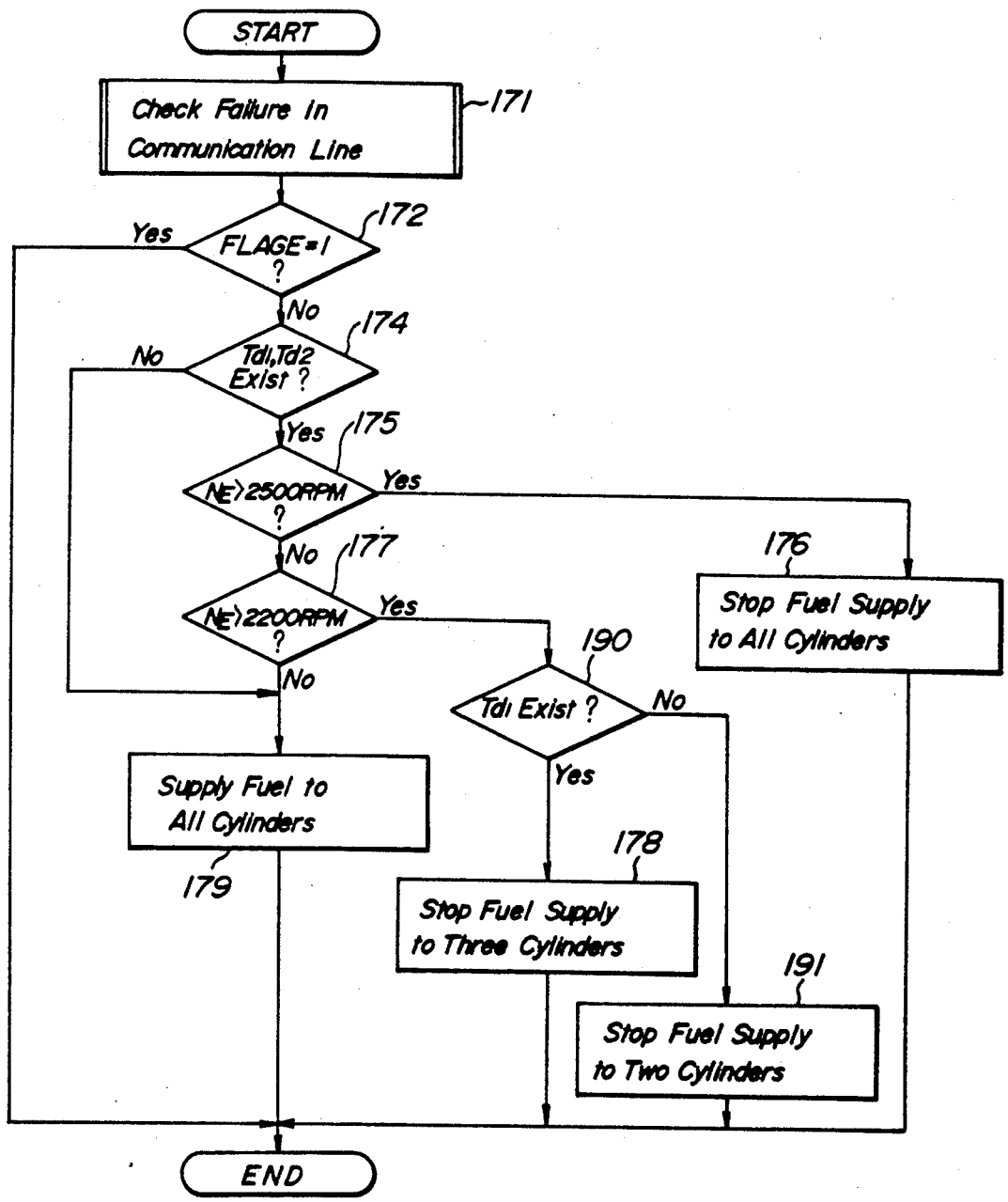

CONTROL APPARATUS WITH FAIL-SAFE FACULTY

BACKGROUND OF THE INVENTION

1. Field of the Invention

The present invention generally relates to an apparatus for performing a control, and more particularly relates to an apparatus for performing an electronic control with a fail-safe faculty. The present invention also relates to a control apparatus for controlling the operation of an engine and an automatic transmission device of an automotive vehicle, and more particularly, the present invention pertains to an electronic control apparatus for effectively reducing a so-called racing select shock which occurs upon starting the automotive vehicle with an automatic transmission in a racing state.

2. Related Art Statement

In an automotive vehicle incorporating an engine, an automatic transmission, and a control apparatus including a plurality of sensors, control circuits and actuators, it has been a common practice to achieve the fail-safe faculty by providing specially selected sensors in a multiplex manner, e.g. in a duplex manner, said sensors being important for performing a desired control. For instance, in a control apparatus for controlling a driving power of an automotive vehicle including electronically controlled engine and automatic transmission, sensors for detecting the vehicle running speed are arranged in a duplex manner and output signals of these vehicle running speed sensors are supplied to a computer for controlling the automatic transmission. Even if one of the vehicle running speed sensors becomes out of order, the control for the automatic transmission can still be performed correctly by using an output signal generated by the other vehicle running speed sensor which still operates normally.

It should be noted that in the automatic transmission having a torque converter and a speed change gear mechanism, the shift of the gear position in the speed change gear mechanism is effected in accordance with the running speed V of the vehicle and an engine throttle opening $T_H$, so that the vehicle running speed sensor is a key sensor. In a control apparatus for the electronically controlled engine, if the vehicle running speed sensor does not work normally, an idling speed of the engine is increased, but this does not seriously affect the running of the engine.

When the sensors are arranged in a multiplex manner, although the fail-safe faculty can be attained, the numbers of I/O ports of CPU, waveform shaping circuits, signal processing programs, abnormal processing programs and so on are increased by the number of sensors which are arranged in a multiplex manner. This results in the construction of the control apparatus and the processing programs becoming complex and the cost potentially being increased.

The above mentioned drawbacks may be reduced by connecting sensors in a multiplex manner for a given control circuit and connecting no sensor to the other control circuit and having a signal generated by the sensor supplied to the other control circuit via a communication line. In this case, the multiplex construction may be attained without increasing the number of sensors. However, in such a control apparatus, if the communication line becomes out of order, a given control could no more be carried out correctly in the other control circuit even if the sensors work normally. This might result in a serious problem.

In the automotive vehicle having the automatic transmission installed therein, when a select operation is effected from a stationary state (N- or P-range) into a running state (D- or R-range), there is produced a select shock upon the engagement of a driving clutch. Particularly, in the case of the racing selection, i.e. when a running range is selected while an accelerator pedal is stepped on in the stationary state, there occurs a very large shock called the racing select shock which causes a driver and passengers to feel uncomfortable.

There have been proposed various methods for mitigating the above mentioned racing select shock. In Japanese Patent Application Laid-open Publications Kokai Sho 61-135,944, 62-292,534 and 60-4,433, there is disclosed a method of reducing the racing select shock by decreasing the engine output before the engagement of the driving clutch, so that an amount of energy absorbed by the driving clutch is decreased.

In Japanese Patent Application Laid-open Publications Kokai Sho 62-17,130 and 63-173,337, there is described another known method of reducing the racing select shock, in which not only the above mentioned reduction in the engine output, but also the reduction in the transfer torque capacity of the clutch are performed. This method can reduce the racing select shock much more effectively as compared with the above mentioned known method.

In the above explained methods of reducing the racing select shock, when a system failure in which one of the controlling elements constituting the control apparatus becomes out of order for instance, when one of the actuators, one of the sensors or the communication faculty does not work satisfactorily, one of the above mentioned three controls, i.e. the reduction in the engine output, the reduction in the transfer torque capacity of the clutch and the shift of the gear position can not be performed and the output torque of the automatic transmission could not be decreased by a desired amount. The inventors have proposed to provide a failure alarm alarming device which is initiated upon system failure, but this solution could not reduce the racing select shock positively.

The above mentioned drawbacks are inherent not only to the control apparatus for the electronically controlled engine and automatic transmission of the automotive vehicle, but also occurs in various other subjects to be controlled.

SUMMARY OF THE INVENTION

An object of present invention is to provide a novel and useful control apparatus with fail-safe faculty comprising a plurality of control circuits, to each of which is connected at least one sensor for detecting at least one operational condition of a subject to be controlled, and a plurality of actuators connected to said control circuits for effecting a plurality of controls for said subject, in which when a system failure occurs, at least one control is carried out without fail.

It is another object of the invention to provide a control apparatus with a fail-safe faculty comprising a plurality of control circuits, to each of which is connected at least one sensor for detecting at least one operational condition of a subject to be controlled, and a plurality of actuators connected to said control circuits for effecting a plurality of controls for said subject, in which when a system failure occurs, at least one control is carried out by changing its control characteristics to attain a fail-safe faculty.

It is still another object of the invention to provide an apparatus for performing a plurality of controls, in which when one of the sensors does not work satisfactorily, a control is carried out by transmitting a signal generated by a sensor which detects the same operational condition as that which is detected by the sensor which is out of order.

It is still another object of the invention to provide a control apparatus for controlling a driving power of an automobile vehicle including an automatic transmission, in which a so-called racing select shock can be reduced even when a system failure occurs.

According to the invention, a control apparatus with fail-safe faculty for performing a plurality of controls upon a subject to be controlled comprises:

a plurality of sensors for detecting operational conditions of the subject to be controlled to generate detection signals;

a plurality of control circuits, to each of which is connected at least one sensor selected from said plurality of sensors to receive at least one detection signal supplied from said at least one sensor, each control circuit processing said at least one detection signal to generate at least one control signal; and a plurality of actuators, each of which is connected to one of said plurality of control circuits to receive said at least one control signal and performs a control for said subject to be controlled; wherein said control circuits are constructed such that at least one control circuit performs at least one control for the subject to be controlled when a system failure in which one of said plurality of sensors and actuators becomes out of order occurs.

According to a further aspect of the invention, a control apparatus with a fail-safe faculty for performing a plurality of controls upon a subject to be controlled comprises:

a plurality of sensors for detecting operational conditions of the subject to be controlled to generate detection signals, sensors relating to at least one predetermined control being arranged in a duplex manner;

a plurality of control circuits, to at least one of which are connected said sensors arranged in a duplex manner and to each of the remaining control circuits is connected at least one sensor selected from said plurality of sensors to receive at least one detection signal supplied from said at least one sensor, each control circuit processing said at least one detection signal to generate at least one control signal; and a plurality of actuators, each of which is connected to one of said plurality of control circuits to receive said at least one control signal and performs a control for said subject to be controlled; wherein said control circuits are constructed such that when a system failure in which one of said plurality of sensors and actuators becomes out of order occurs, said predetermined control and at least one control which may be conducted correctly without being affected by said system failure are performed without fail.

According to a still further aspect of the invention, a control apparatus with fail-safe faculty for performing a plurality of controls upon a subject to be controlled comprises:

a plurality of sensors for detecting operational conditions of the subject to be controlled to generate detection signals;

a plurality of control circuits, to each of which is connected at least one sensor selected from said plurality of sensors to receive at least one detection signal supplied from said at least one sensor, each control circuit processing said at least one detection signal to generate at least one control signal; and a plurality of actuators, each of which is connected to one of said plurality of control circuits to receive said at least one control signal and performs a control for said subject to be controlled; wherein said plurality of control circuits are constructed such that at least one control circuit performs at least one control by changing its control characteristics when a system failure in which one of said plurality of sensors and actuators becomes out of order occurs.

In a preferable embodiment of the control apparatus of to the invention, said control circuits are constructed such that when said system failure occurs, at least one control which may be conducted correctly without being affected by said system failure is performed.

According to a still further aspect of the invention, a control apparatus with a fail-safe faculty for performing a plurality of controls upon a subject to be controlled comprises:

a plurality of sensors for detecting operational conditions of the subject to be controlled to generate detection signals, at least two sensors of said plurality of sensors detecting the same operational condition of the subject;

a plurality of control circuits, to each of which is connected at least one sensor selected from said plurality of sensors to receive at least one detection signal supplied from said at least one sensor, each control circuit processing said at least one detection signal to generate at least one control signal and said at least two sensors for detecting the same operational condition of the subject being connected to different control circuits;

a plurality of actuators, each of which is connected to one of said plurality of control circuits to receive a control signal and performs a control for said subject to be controlled; and at least one signal transmission line connected between said plurality of control circuits for transmitting the detection signals detected by said sensors and/or information about the operational condition of the sensors; wherein said control circuits are contracted such that detection signals generated by said at least two sensors and information about operational condition of said at least two sensors are transmitted between said different control circuits via said communication line.

According to a still further aspect of the present invention, a control apparatus with a fail-safe faculty for controlling a driving power of an automotive vehicle including an electronically controlled engine and an automatic transmission having a torque converter and a speed change gear mechanism comprises:

sensing means including a plurality of sensors for detecting operational conditions of the vehicle to generate detection signals;

judging means for processing said detection signals to generate an abnormal start signal when an abnormal start operation effected by a driver is detected;

first controlling means for reducing an output power of the engine in response to said abnormal start signal;

second controlling means for reducing a clutch transfer torque capacity of said speed change gear mechanism of the automatic transmission in response to said abnormal start signal; and third controlling means for controlling said speed change gear mechanism of the automatic transmission in response to said abnormal start signal such that a gear position is shifted into a predetermined gear position at which an output torque of the automatic transmission is lower than a value which is produced under a normal start operation; wherein said first, second and third controlling means are constructed such that when a system failure in which one of said plurality of sensors of the sensing means becomes out of order occurs, a predetermined one of said first, second and third controlling means is operated to perform a control without fail.

According to a still further aspect of the invention, a control apparatus with a fail-safe faculty for controlling a driving power of an automotive vehicle including an electronically controlled fuel-injection type engine and an automatic transmission with a torque converter and a speed change gear mechanism comprises:

sensing means including a plurality of sensors for detecting operational conditions of the automotive vehicle to generate detection signals;

judging means for processing said detection signals to generate an abnormal start signal when an abnormal start operation effected by a driver is detected;

first controlling means for performing a first control in which an output power of the engine is reduced in response to said abnormal start signal;

second controlling means for performing a second control in which a clutch transfer torque capacity of said speed change gear mechanism of the automatic transmission is reduced in response to said abnormal start signal; and third controlling means for performing a third control in which said speed change gear mechanism of the automatic transmission is controlled such that a gear position is shifted in response to said abnormal start signal into a predetermined gear position at which an output torque of the automatic transmission becomes lower that a value which is produced under a normal start operation; wherein said first, second and third controlling means are constructed such that when one of said first, second and third controls can not be performed due to a system failure, the remaining two controls are performed by changing operational characteristics of these two controls.

According to a still further aspect of the invention, a control apparatus with a fail-safe faculty for controlling a driving power of an automotive vehicle including an electronically controlled fuel-injection type engine and an automatic transmission with a torque converter and a speed change gear mechanism controlled by a manual select lever comprises:

an engine control computer for performing a first control in which an output torque of the engine is reduced when an abnormal start operation which might cause a racing select shock is detected;

a transmission control computer for performing a second control in which an output torque of the automatic transmission is reduced upon the detection of the abnormal start operation;

a communication line connected between the engine control computer and the transmission control computer;

first and second engine running sensors for detecting the engine running speed $N_E$ and connected to said engine control computer and transmission control computer, respectively;

first and second vehicle running speed sensors for detecting the vehicle running speed V and connected to said engine control computer and transmission control computer, respectively;

first and second inhibitor switches for detecting a range position S selected by said manual select lever and connected to said engine control computer and transmission control computer, respectively;

a throttle sensor for detecting a throttle opening $T_H$ and connected parallely to said engine control computer and transmission control computer;

an intake air sensor for detecting an intake air quantity Q and connected to said engine control computer; and input and output sensors for detecting rotation speeds of input and output shafts, respectively of the speed change gear mechanism and connected to said transmission control computer; wherein said engine control computer and transmission control computer are constructed such that under no system failure, said transmission control computer generates an abnormal start signal representing the abnormal start operation by processing the engine running speed $N_E$ detected by said second engine running speed sensor and the range position S detected by said second inhibitor switch and said abnormal start signal is supplied to the engine control computer via said communication line to perform said first control, and when a system failure in which one of said second engine running speed sensor and second inhibitor switch becomes out of order occurs, the transmission control computer generates a system failure signal, said system failure signal is supplied to said engine control computer, and said engine control computer generates in response to said system failure signal the abnormal start signal by processing the engine running speed $N_E$ detected by said first engine running speed sensor and the range position S detected by said first inhibitor switch to perform the first control.

In a preferable embodiment of the control apparatus, said engine control computer and transmission control computer are constructed such that when a system failure in which said communication line becomes out of order occurs, said engine control computer detects this system failure and performs said first control in response to the abnormal start signal generated by the engine control computer, and said transmission control computer performs said second control in response to the abnormal start signal generated by the transmission control computer.

BRIEF DESCRIPTION OF THE DRAWINGS

FIG. 8 is a circuit diagram depicting an embodiment of the circuit for judging the operation of the shift solenoid;

FIGS. 9A, 9B and 9C are graphs representing the controlling operation of the control apparatus;

FIG. 10 is a block diagram showing another embodiment of the control apparatus according to the invention;

FIG. 11 is a flow chart illustrating the operation of the control apparatus shown in FIG. 10;

FIG. 12 is a flow chart representing the operation of the subroutine for detecting the abnormal start operation; and FIG. 13 is a flow chart denoting the operation of the subroutine for effecting the engine output reduction control in the embodiment depicted in FIG. 10.

DESCRIPTION OF THE PREFERRED EMBODIMENTS

Figure 1:
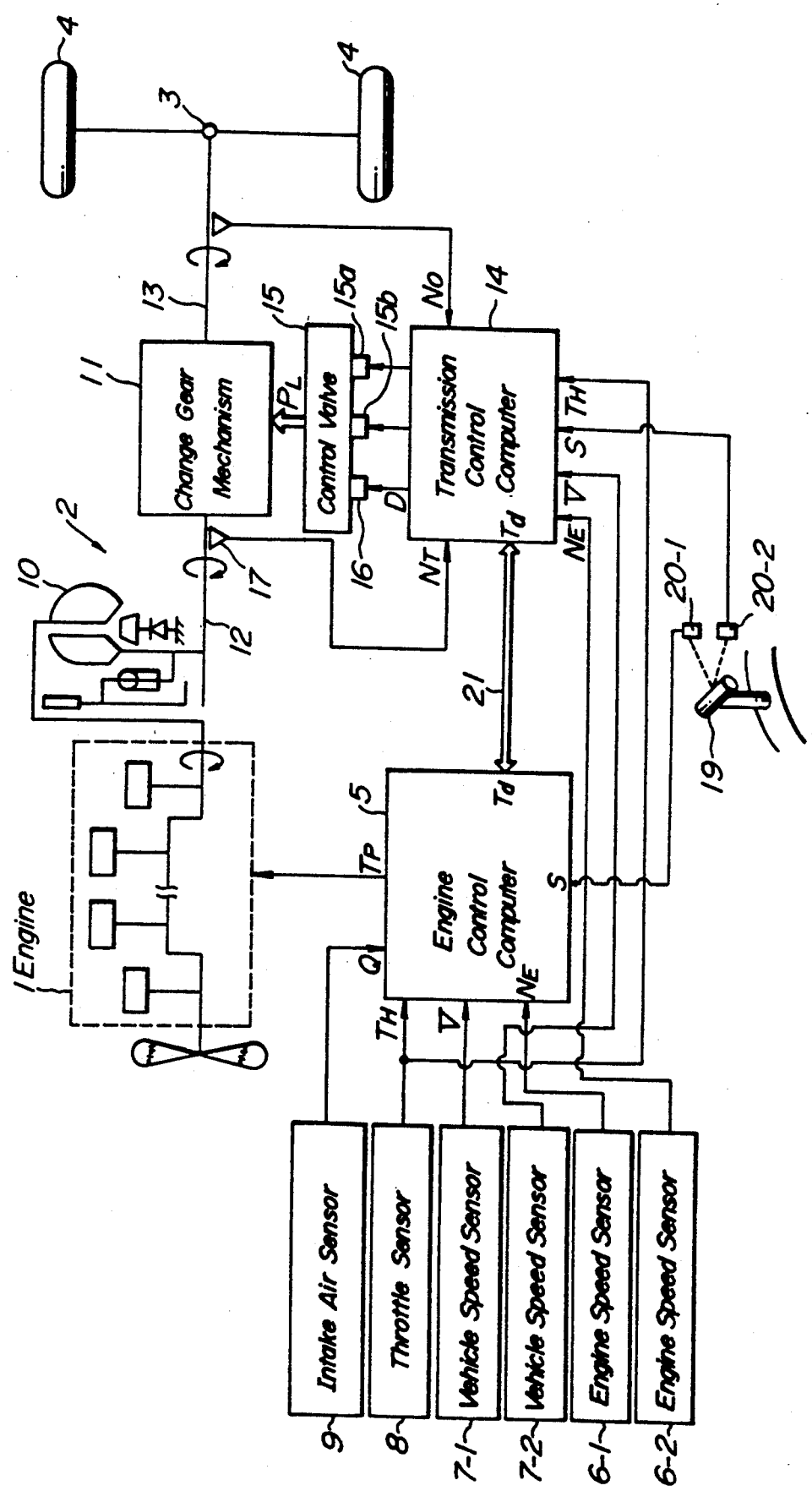
FIG. 1 is a block diagram showing an embodiment of a power train of an automotive vehicle equipped with the control apparatus according to the invention.

FIG. 1 is a block diagram showing an embodiment of a power train of an automotive vehicle equipped with the control apparatus according to the present invention. In this embodiment, the control apparatus with fail-safe faculty controls both engine and automatic transmission in a unified manner and comprises an engine control computer, a transmission control computer, and sensors connected to those computers as will be explained later.

The automotive vehicle comprises an electronically controlled fuel-injection type engine 1 having six cylinders, automatic transmission 2, differential gear assembly 3 and driving wheels 4.

The control apparatus comprises an engine control computer 5 to which are connected engine running speed sensor 6-1 for detecting a running speed of the engine N E, vehicle running speed sensor 7-1 for detecting a running speed V of the vehicle, throttle sensor 8 for detecting the engine throttle opening T H, intake air sensor 9 for detecting the engine intake air quantity Q, and inhibitor switch 20-1 for detecting a signal S representing a shift range selected by a manually operated shift lever 19. The engine control computer 5 receives all the above mentioned signals detected by the sensors and determines a fuel-injection pulse width TP. The engine control computer 5 supplies a control signal having the thus determined pulse width to the engine 1, so that the engine receives the fuel whose amount is determined by the pulse width. Further, the engine control computer 5 supplies a signal for determining the ignition timing to the engine. In the present embodiment, the engine control computer 5 further controls the number of cylinders to which the fuel is supplied in accordance with an engine output reduction request signal $T_d$ as will be explained hereinafter. Moreover, the engine control computer 5 functions to cut the fuel supply when the vehicle running speed exceeds a predetermined maximum value by processing the detected vehicle running speed V.

The automatic transmission 2 comprises torque converter 10 and speed change gear mechanism 11 in tandem, and the engine output power is supplied to an input shaft 12 of the transmission 2 via the torque converter 10. The input rotational speed of the shaft 12 is increased or decreased in accordance with a shifted gear position of the change gear mechanism 11, and then is transmitted to an output shaft 13. The output shaft 13 is coupled with the driving wheels 4 via the differential gear assembly 3 to drive the vehicle.

The speed change gear mechanism 11 includes various frictional elements such as clutches and brakes for determining a gear position of the transmission, i.e. a power transfer route from the input shaft 12 to the output shaft 13. The frictional elements are actuated selectively and hydraulically with a line pressure PL in such a manner that the gear position is shifted into a desired position so as to obtain a desired gear ratio.

In order to control the speed change gear mechanism 11 in the manner described above, the control apparatus comprises a transmission control computer 14 which controls a control valve 15 coupled with the change gear mechanism 11. The transmission control computer 14 supplies signals to shift solenoids 15a and 15b to control the control valve 15 such that the desired gear position is attained.

The transmission control computer 14 further controls a duty solenoid 16 for controlling the line pressure PL. More specifically, a duty cycle of a driving signal for the duty solenoid 16 is adjusted by the transmission control computer 14 to change the line pressure PL. When the duty cycle of the driving signal is increased, the line pressure PL is increased. It should be noted that the clutch transfer torque capacity is reduced by decreasing the line pressure, so that the clutch pressure PCL is reduced.

In order to perform the above mentioned controls, the transmission control computer 14 is are connected to the engine running speed sensor 6-2, vehicle running speed sensor 7-2, throttle sensor 8 and inhibitor switch 20-2. In addition, the important sensors for detecting the racing select start operation, i.e. engine running speed sensor, vehicle running speed sensor and inhibitor sensor are arranged in a duplex mode, Further, the transmission control computer 14 is connected to an input speed sensor 17 for detecting the rotation speed N T of the input shaft 12, and an output speed sensor 18 for detecting the rotation speed NO of the output shaft 13.

The transmission control computer 14 serves to execute the conventional controls such as the gear position control, shift range control and line pressure control. Since these conventional controls are not directly related to the subject matter of the present invention, they are not explained here in detail. As will be understood from the following explanation, in the present embodiment, the transmission control computer 14 works as a main computer for reducing the racing select shock and supplies an engine output reduction request signal $T_d$ to the engine control computer 5 via a communication line 21 when the abnormal start operation is detected.

Figure 2:
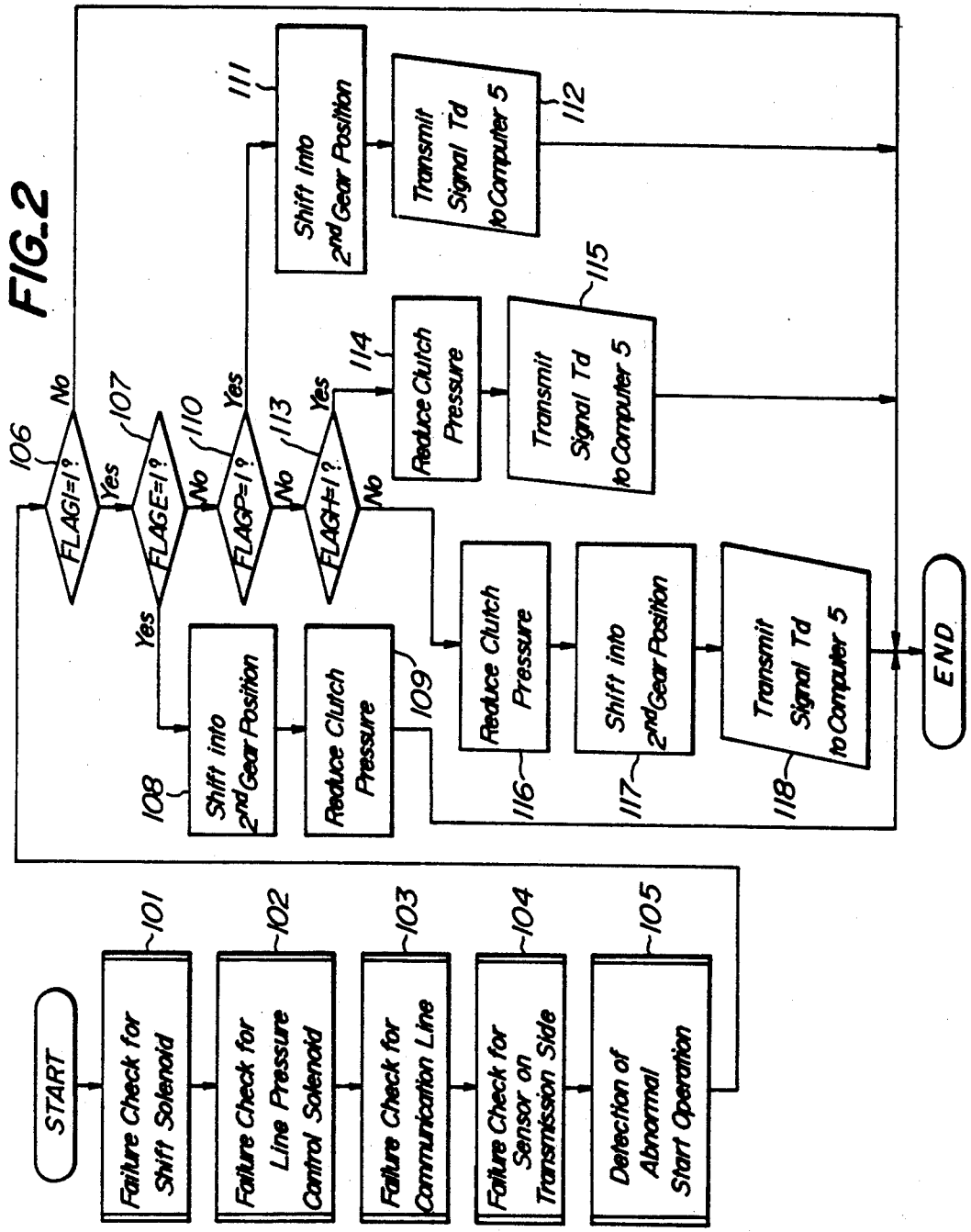
FIG. 2 is a flow chart illustrating the operation of the control apparatus shown in FIG. 1.

Next, the control performed by the control apparatus of the present embodiment will be explained with reference to a flow chart illustrated in FIG. 2. This control is executed by the transmission control computer 14 in repeat by a periodical interruption of a predetermined period. In the drawing, at first in a step 101, a failure check is performed for the gear position shift solenoids 15a and 15b. The failure check is carried out by a failure check circuit shown in FIG. 8. The failure check circuit comprises a transistor 30 whose base is connected to a digital output port 14a of the transmission control computer 14. A collector of the transistor 30 is connected to a digital input port 14B and to one end of the solenoid 15a (15b) whose other end is connected to the ground, and an emitter of the transistor 30 is grounded. Across the shift solenoid 15a (15b) is connected a DC power source 31.

The failure of the shift solenoid 15a (15b) is carried out by detecting a solenoid voltage VS produced across the shift solenoid when it is driven by a signal generated from the digital output port 14a of the transmission control computer 14. The solenoid voltage VS is read into the computer 14 by means of the digital input port 14B. More specifically, if the input port 14B becomes low level when the output port 14a is set to high level, or if the input port 14B becomes high level when the output port 14a is set to low level, then the shift solenoid is judged to operate normally, otherwise the solenoid is judged to be in a failure state fail. In particular, if the input port 14B is always low level irrespective of the level of the output port 14A, it can be judged that the shift solenoid is always in ON condition due to a short-circuit in a harness. In a Nissan RE4R01A Type Automatic Transmission" which is used in the present example, if the gear position shift solenoids 15a and 15b both become out of order, the speed change gear is fixedly shifted into a predetermined gear position having the lowest gear ratio. Due to this failure check, if a failure is detected, then a flag FLAGH is set, i.e. FLAGH=1, and if no failure is detected, then the flag FLAGH is not set, i.e. FLAGH=0.

Figure 3:
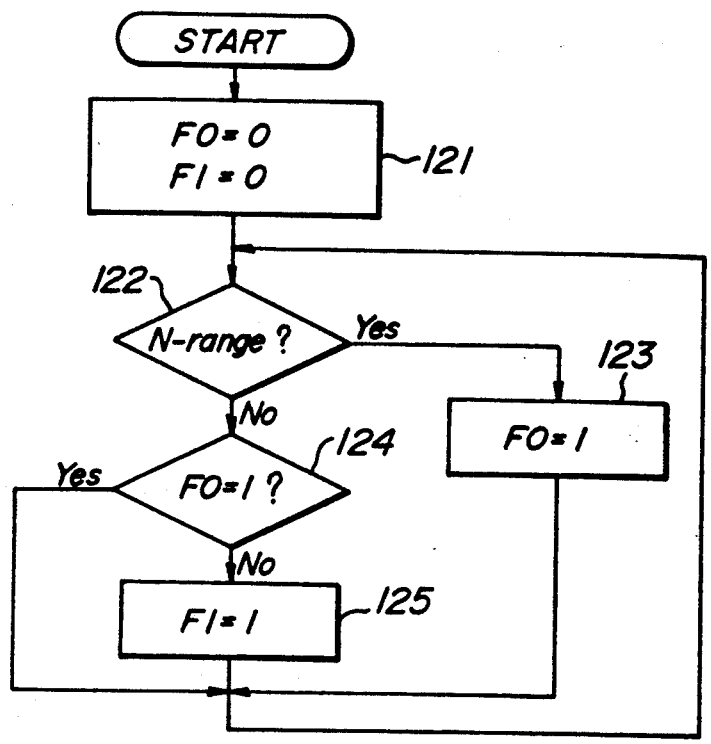
FIG. 3 is a flow chart depicting the operation of the subroutine for detecting the failure of the inhibitor switch.

In a next step 102, in the same manner as above, a failure check is performed for the line pressure control duty solenoid 16, and in this check, if a failure is detected, then a flag FLAGP is set (FLAGP=1), and if no failure is detected, then FLAGP=0. And in the following step 103, a failure check is performed for a communication faculty between the computers 5 and 14. A method of checking the operation of the communication line 21 does not intimately relate to the subject matter of the present invention, therefore it is not explained here. If necessary, a reference should be made to manuals for communication IC and the like. Here, if the communication faculty has been found to have failed due to a cut of the communication line 21, then a flag FLAGE is set, i.e. FLAGE=1, and if non-failure, then FLAGE=0. Further, in a next step 104, a failure check is performed for the engine running speed sensor 6-2 and inhibitor switch 20-2 which are used for detecting the abnormal start operation (detailed explanation for this failure check will be made later by referring to FIGS. 3 through 5), and if a failure of the inhibitor switch 20-2 is detected, a flag F1 is set, i.e. F1=1, and if non-failure, then F1=0. Similarly, if a failure of the engine running speed sensor 6-2 is detected, a flag F2 is set. In the succeeding step 105, a judgment of the existence of an abnormal start operation which might cause the racing select shock is performed (this step 105 will be also explained later in detail). If the abnormal start operation is detected, a flag FLAG1 is set.

In a step 106, the condition of the flag FLAG1 representing the abnormal start operation is checked. In this judgment, if No, i.e., if the normal start operation represented by FLAG1=0 has been detected, then the control is terminated as it is, and if Yes, i.e., if the abnormal start operation represented by FLAG1=1 has been detected, then the control is suitably performed depending on a presence or kinds of the failure by the check of respective flags in steps following the step 106.

In specific, in a step 107, a decision is made as to whether or not FLAGE=1, and if the decision is Yes, i.e. if FLAGE=1 due to a failure in the communication faculty, then in a step 108, the gear position is shifted into the second gear position in which the output torque of the automatic transmission is reduced to a value lower than that which is produced when the gear position is shifted into the first gear position in the normal start operation. Further in a step 109, the line pressure PL of the automatic transmission is reduced to a low value by adjusting the duty cycle D of the driving signal supplied to the pressure control duty solenoid 16 to reduce the clutch pressure PCL (this pressure is a forward clutch pressure, and for its detail, refer to Nissan RE4R01A Type Automatic Transmission Maintenance Manual"). In this case, since the communication faculty is out of order, the torque reduction request signal $T_d$ could not be transmitted from the transmission control computer 14 to the engine control computer 5.

In the step 107, if No, i.e. if the communication faculty is not out of order as represented by FLAGE=0, then the decision is made on whether or not FLAGP=1 in a step 110, and if Yes, i.e. if the reduction control of the clutch pressure PCL based on the line pressure control with the aid of the duty solenoid 16 is impossible, then in a step 111 the gear position is shifted into the second gear position. Then, in a step 112, the torque reduction request signal $T_d$ is supplied from the transmission control computer 14 to the engine control computer 5 via the communication line 21. Also, if the duty solenoid 16 for controlling the line pressure is not out of order and the step 110 goes through No decision, in a step 113, a decision on whether or not FLAGH=1 is performed, and if Yes, i.e. if the gear ratio control is impossible due to failure of the gear position shift solenoids 15a, 15b, in a step 114, the clutch pressure reduction control is carried out like as in the step 109, and in a step 115, the torque reduction request signal $T_d$ is sent to the engine control computer 5 like as in the step 112. If the decision in the step 113 is No, i.e. if the solenoids 15a, 15b, 16 and the communication faculty are all normal, then the above described three different controls, i.e. the clutch pressure reduction, the gear position shift into the second gear position, and the transmission of the torque reduction request signal $T_d$ to the engine control computer 5 are all carried out in steps 116, 117 and 118.

Figure 4:
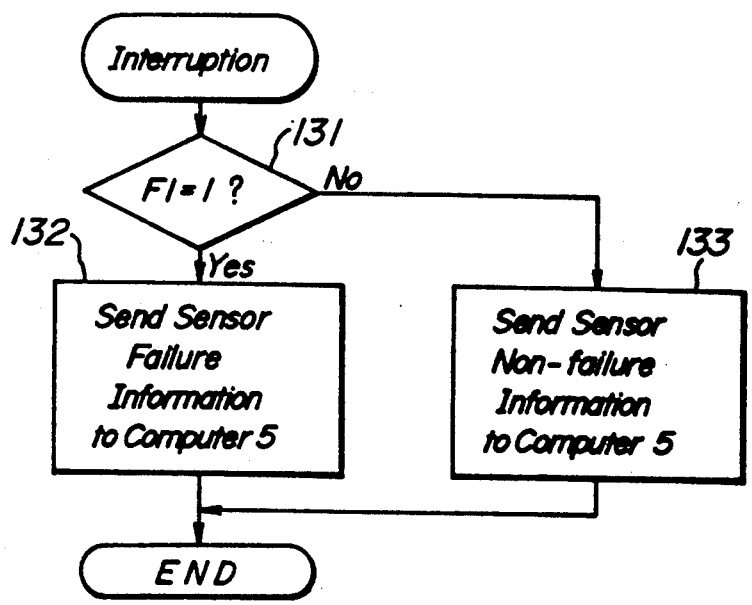
FIG. 4 is a flow chart showing an interrupt routine which monitors an inhibitor switch condition flag set by the subroutine shown in FIG. 3.

Next, the explanation will be made for the detail of the failure check process in the step 104 in FIG. 2. More specifically, subroutines of the failure checks for various sensors connected to the transmission control computer 14 will be explained with reference to flow charts shown in FIGS. 3 through 5. First, in the failure check of the inhibitor switch 20-2, an initial process is carried out in a step 121 in FIG. 3, more in detail, flags F0 and F1 are reset (F0=0, F1=0) at the time when the power is supplied to the control apparatus, and next in a step 122, a decision is made on whether or not the transmission shift lever 19 is selected into the neutral range (N-range). Here, if the N-range is normally selected at the time of the starting and thereafter D-range is selected, a control goes from Yes of the step 122 to a step 123, where the flag F0 is set(F0=1), and next, the control further goes from No of the step 122 to a step 124, where a decision on whether F0=1 or not is performed. In this judgment, if the step 123 is correctly executed, in other words, if the inhibitor switch 20-2 operates normally, then Yes is obtained. In view of the above operation, the control results in repeating a loop of Yes of step 124 - No of step 122 - Yes of step 124, while the flag F1 is maintained to be in the reset condition (F1=0) which has been reset in the step 121. On the other hand, if the decision in the step 124 becomes No in spite of the completion of the starting operation, it is, no doubt, regarded as a failure of the inhibitor switch 20-2, and accordingly, the flag F1 is set (F1=1) in the step 125. During the operation in the above, the condition of flag F1 is checked in a step 131 by the control program executed repeatedly by an interrupt process as shown in FIG. 4, and if F1=1, then in a step 132, a signal representing a sensor failure is sent from the transmission control computer 14 to the engine control computer 5. To the contrary, if F1=0, then in a step 133, a signal informing the correct operation of sensors is supplied from the transmission control computer 14 to the engine control computer 5. In this manner, in the present embodiment, the information representing the operational conditions of the sensors connected to the transmission control computer 14 is transmitted to the engine control computer 5 by means of the communication line 21.

Figure 5:
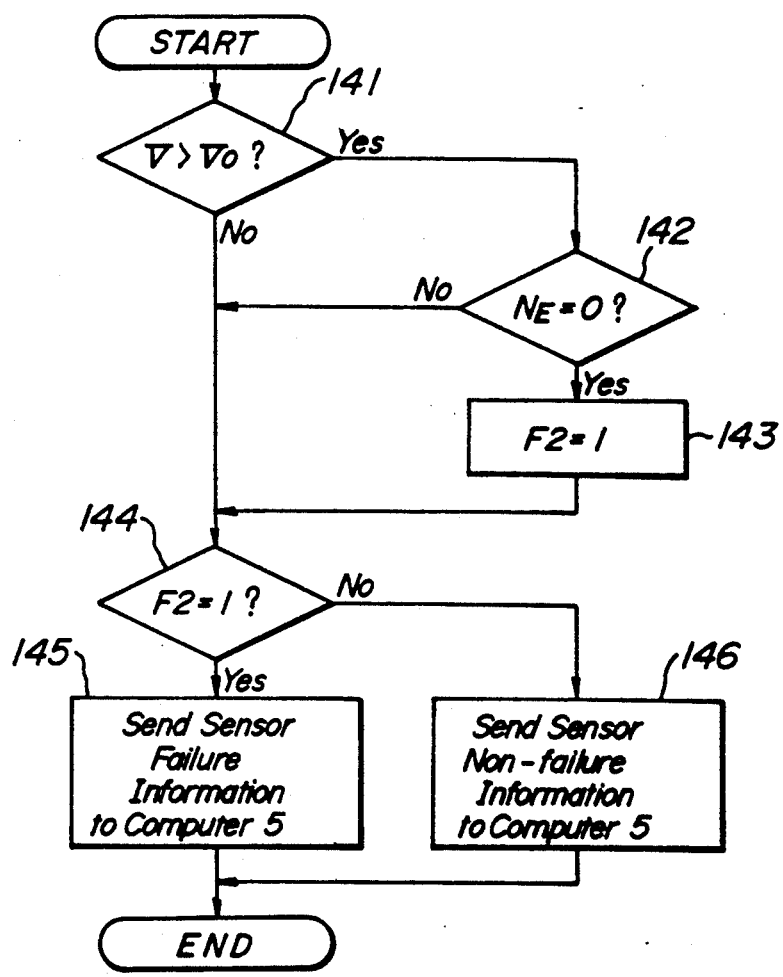
FIG. 5 is a flow chart representing the operation of the subroutine for detecting the failure of the engine running speed sensor.

FIG. 5 is a flow chart illustrating a subroutine for effecting the failure check for the engine running speed sensor 6-2 connected to the transmission control computer 14. At first, a decision is made in a step 141 as to whether or not the running speed V of the vehicle detected by the running speed sensor 7-2 exceeds a predetermined value V0 (for example, 60 km/h). If the vehicle running speed is in a high speed region satisfying V>V0, a check is made on whether the engine running speed $N_E$ detected by the engine running speed sensor 6-2 is zero or not in a step 142. Here, if Yes, i.e., if the detected engine running speed $N_E$ does not rise due to a failure of the engine running speed sensor 6-2 even if the vehicle is running at a higher speed, a flag F2 is set (F2=1) in a step 143. Then, the condition of the flag F2 is checked in a step 144. If F2=1, the sensor failure information is sent from the transmission control computer 14 to the engine control computer 5 via the communication line 21 in a step 145, and if F2=0, the sensor non-failure information is supplied from the transmission control computer 14 to the engine control computer 5 in a step 146. In the step 143, when the flag F2 has been once set, it is stored in a backup memory in order to use it in a judgment at a time of a next vehicle start operation, so that it is not lost when the power supply is interrupted. In this connection, in the control program in FIG. 5, the flag F2 is set only when the vehicle runs at a higher speed than 60 km/h. After the engine running speed sensor 6-2 is replaced by a new one, the flag F2 stored in the backup memory is reset.

Now the subroutine for judging the abnormal start operation shown in the step 105 in FIG. 2 will be explained with reference to a flow chart illustrated in FIG. 6. At first, in a step 151, a decision is made regarding the presence of failure in the sensors on the automatic transmission side. The sensor failure is decided when at least one of the above mentioned flags F1 and F2 has been set. At the time of sensor failure, the flag FLAG1 is set or not set in a step 152 by using the information which is generated by the engine control computer 5 by processing the signals detected by the engine running speed sensor 6-1 and inhibitor switch 20-1 on the engine control computer, said information representing the start operation, i.e. the normal start operation or the abnormal start operation. This operation is entirely same as that effected by steps 153 to 163 in a manner to be explained later.

On the other hand, in case of the normal operation of the sensors, in the step 153, based on the signal S generated by the inhibitor switch 20-2 expressing the select range of the manual select lever 19, a decision is made as to whether the selected range is the N-range or P-range. At the start of the vehicle, either the neutral range (N-range) or the parking range (P-range) is selected, and thus in the step 154 next to Yes of the step 153, flags FLAG3 and FLAG1 are reset (FLAG3=0, FLAG1=0) The flag FLAG3 is a flag showing whether or not the N-range or P-range has been selected in the last subroutine has been performed (if either N-range or P-range, then FLAG3=0). The FLAG1 represents whether the abnormal start operation is performed or not (if it is judged that the abnormal start operation has been effected, then FLAG1=1).

In this way, if the driver selects the driving range from the condition in which FLAG3=0, then in the step 155 next to No of the step 153, a decision is carried out whether or not FLAG3=0 is established. Here, if FLAG3=0, it means that the start operation has been performed (for example, the select lever 19 is shifted from the N-range into the D-range), and accordingly, the flag FLAG3 is set (FLAG3=1) in a step 156 next to Yes of the step 155, and in the step 157, a decision is executed whether or not the engine running speed $N_E$ detected by the engine running speed sensor 6-2 exceeds 3000 RPM. In this judgment, if Yes, i.e. if $N_E$>3000 RPM, then the flag FLAG1 showing the abnormal start operation is set (FLAG1=1) in the step 158. After that, in the step 159, a timer TIMER is reset (TIMER=0). In this manner, the control proceeds from Yes of the step 155 to the step 156 only once in the first flow, and after that the judgment in the step 155 goes to No, because FLAG3=1 has been established by carrying out the step 156.

Then, in a step 160, it is judged whether or not the FLAG1 has been set (FLAG1=1). Here, because FLAG1=1 has been established at the time of the abnormal start operation through the steps 155-156-157-158-159, the control is proceeded from Yes of the step 160 to a step 161, and the timer TIMER is incremented (TIMER=TIMER+1). The increment of the timer is repeated until the judgment in the step 162 becomes Yes. After a predetermined period K has lapsed, then in a step 163, the flag FLAG1 is reset (FLAG1=0). Further, when the control proceeds from No of the step 155 and No of the step 157 respectively to the step 160, because the flag FLAG1 remains being reset (FLAG1=0) in the step 154, the decision in the step 160 becomes No. Then, the control is terminated as it is. Due to the control in FIG. 6, if the running speed $N_E$ of the engine at the starting operation exceeds the predetermined speed of 3000 RPM, the flag FLAG1 is set only for the predetermined time period K of the timer.

Next, the control for reducing the output torque of the engine 1 will be explained with reference to a flow chart shown in FIG. 7. At first, in a step 171, the failure check is performed for the communication faculty between the engine control computer 5 and the transmission control computer 14 in a similar manner to that of the step 103. Then, in a next step 172 the condition of the flag FLAGE is checked. When the communication faculty has been checked to be normal (FLAGE=0), in a step 173, it is checked whether or not the sensors 6-2 and 20-2 on the side of the transmission control computer 14 are out of order. When this judgment results in No, i.e. when the sensors works satisfactorily, it is further checked whether or not the torque reduction request signal $T_d$ is transmitted from the transmission control computer 14 in a step 174. If the torque reduction request signal is transmitted, then in a step 175 it is judged whether the engine running speed $N_E$ exceeds 2500 RPM or not. If $N_E > 2500$ RPM in the above judgment is satisfied, then a fuel supply to all the cylinders (six cylinders) of engine 1 is stopped to reduce suddenly the engine output in a step 176, and if $N_E$ is equal to or lower than 2500 RPM, then a decision is performed on whether the engine running speed $N_E$ exceeds 2200 RPM or not in a step 177. If $N_E > 2200$ RPM in this judgment, a fuel supply to half the number of cylinders (three cylinders) of the engine 1 is stopped thereby to reduce the engine output in a step 178, and if $N_E$ is equal to or lower than 2200 RPM, the fuel is supplied to all the six cylinders in a step 179. When in the step 174, the normal start operation is detected, a control step is proceeded from No of the step 174 to a step 179, and the fuel is supplied to all the six cylinders of the engine 1 and the reduction of engine output is not effected.

On the other hand, when the control goes from Yes of the step 172 upon a failure of the communication faculty (FLAGE=1), and when the control goes from Yes of the step 173 upon a failure of the sensors on the side of the transmission control computer 14, the engine control computer 5 itself must perform the process of the abnormal start operation, because the torque reduction request signal $T_d$ could not be transmitted from the transmission control computer 14. In detail, in a step 180, the engine control computer 5 detects the occurrence of the abnormal start operation on the basis of the signals generated by the engine running speed sensor 6-1 and the inhibitor switch 20-1 on the engine control computer side in the same manner as in the step 105. If the abnormal start condition is detected, the FLAG1 is set (FLAG1=1). Then, in a step 181, a decision is performed on whether or not there has been detected the abnormal start operation by checking the condition of the FLAG1. At the time of the normal start operation (FLAG1=0), then the fuel is supplied to all the cylinders in the step 179. When the abnormal start operation has been detected (FLAG1=1), then in a step 182, information representing the abnormal start operation is generated in the engine control computer 5, and thereafter, the control is proceeded through the steps 175 to 179 to execute the same engine output reduction as described above in the case of no failure in the communication line 21.

The explanation will now be made in detail for the operation of the control described above by referring to FIGS. 9A, 9B and 9C. FIG. 9a denotes the position of the manually operated shift lever 19. FIG. 9B represents the variation of the clutch pressure, and a broken curve a shows the case in which the clutch pressure is reduced upon the detection of the abnormal start condition and a solid curve B denotes the case in which no control is performed. FIG. 9C express the variation of the output power of the automatic transmission 2.

Figure 6:
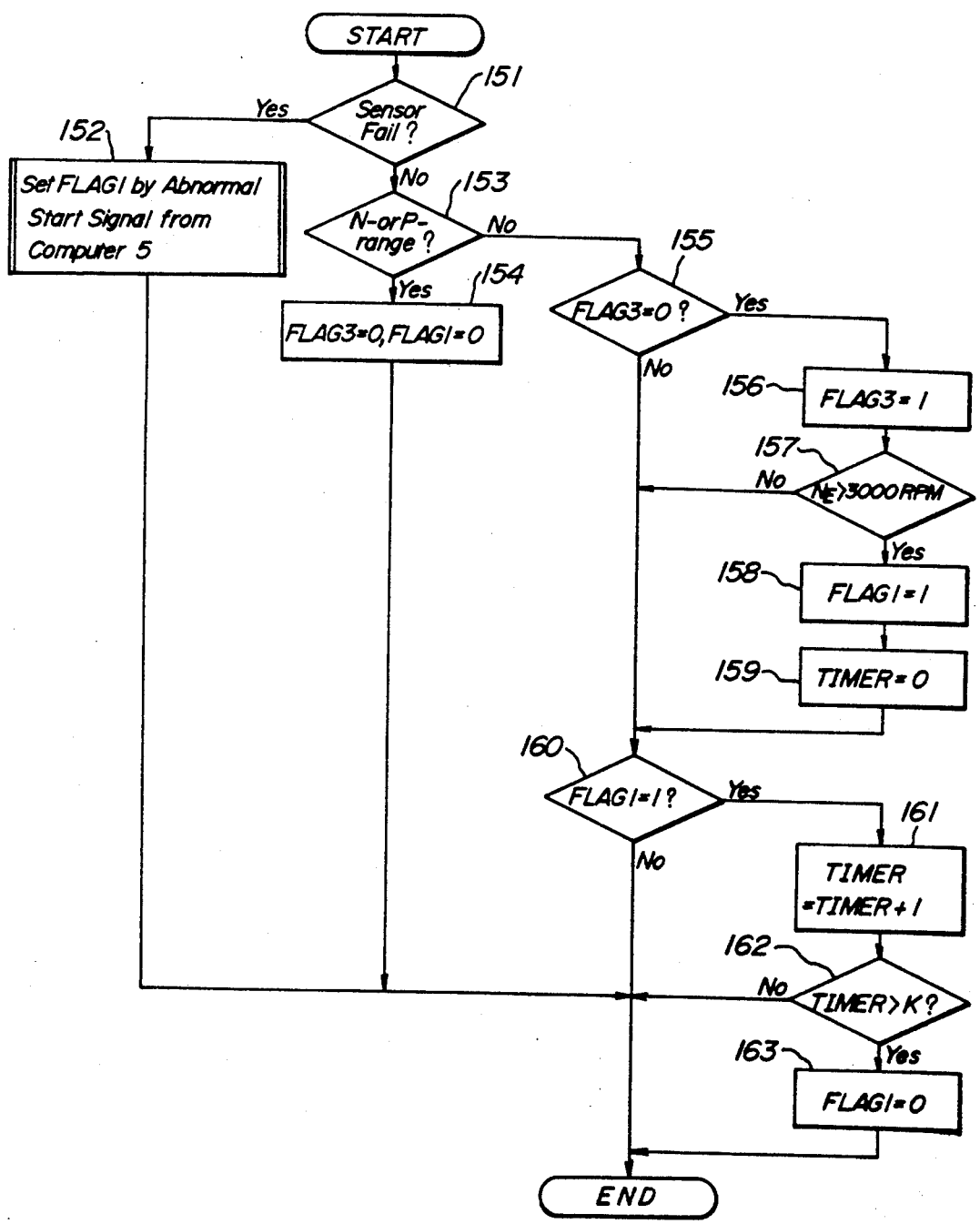
FIG. 6 is a flow chart showing the operation of the subroutine for detecting the failure of the abnormal start operation.

First, if the start operation (the select lever 19 is moved from N-range or P-range into D-range) performed at an instant t1 in FIG. 9 is the abnormal start operation in which the engine running speed $N_E$ exceeds the predetermined value of 3000 RPM due to the racing condition of the engine, the above explained control through the steps 153-154-153-155-156-157-158 in FIG. 6 is executed on the side of the transmission control computer 14, and the flag FLAG1 representing the abnormal start operation is set (FLAG1=1). The FLAG1 is maintained being set until the completion of time lapse of the predetermined period K starting from the instant t1, by repeating the steps 159-160-161-162-151-153-155-160, and the meantime, at least one of the clutch pressure reduction control and the gear position change control is performed by executing the steps 108, 109 and the like in FIG. 2.

Figure 7:
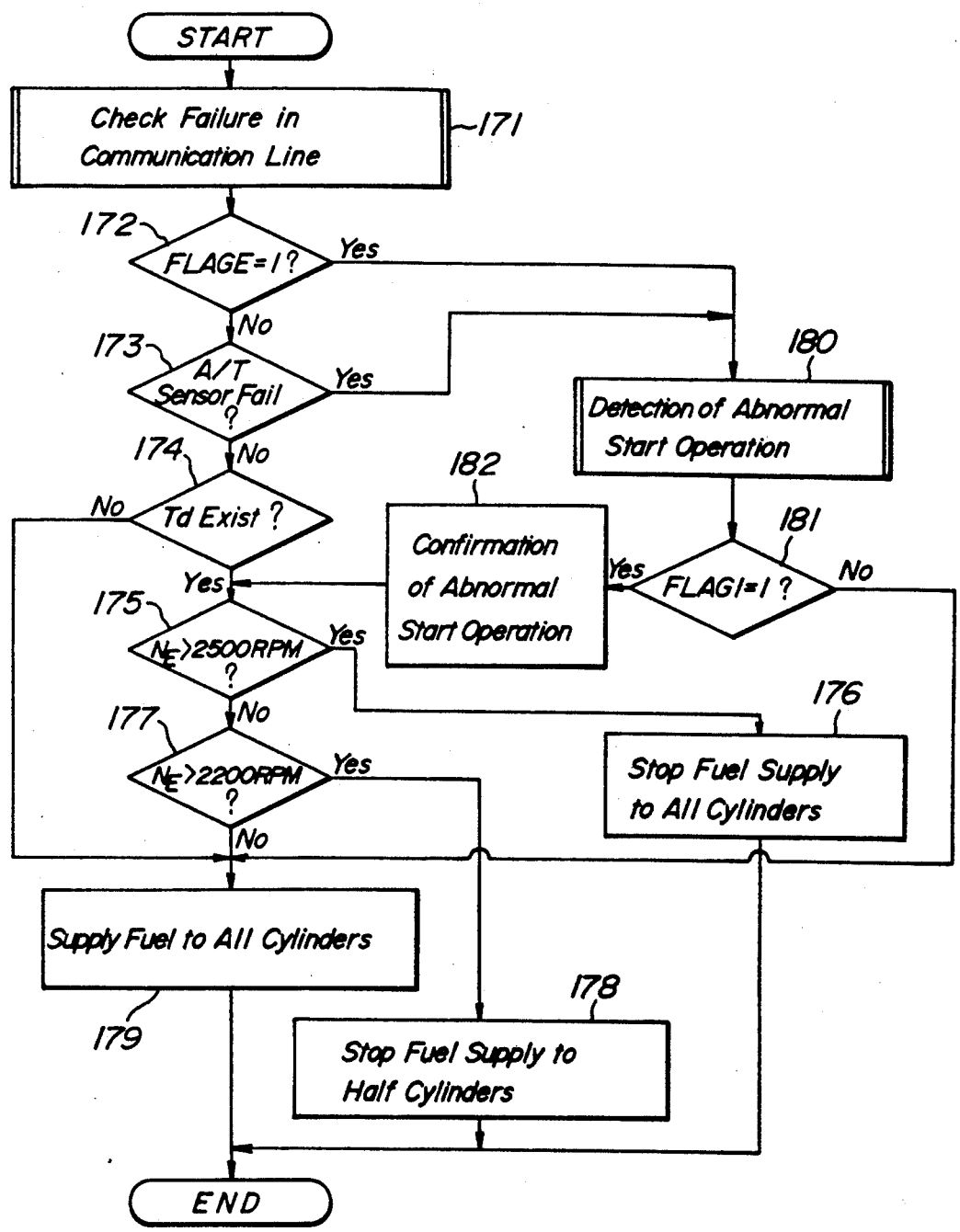
FIG. 7 is a flow chart illustrating the operation of the subroutine for reducing the engine output.

On the other hand, on the side of the engine control computer 5, the engine output reduction control (the control of the number of cylinders to which the fuel is supplied) to stop the fuel supply to all the six engine cylinders is initially performed by executing the steps 171-172-173-174-175-176 or steps 171-172-173-180-181-182-175-176 shown in FIG. 7. In the meantime, the automatic transmission output torque is further reduced as shown by a bouble-dotted chain curve a in FIG. 9C. In FIG. 9C, a broken curve B denotes the the case in which only the engine output reduction control is performed, and a chain curve C represents the case in which both the engine output reduction control and the clutch pressure reduction control are carried out. From these controls, a desired reduction quantity of the automatic transmission output torque is achieved, and even at the time of the abnormal start operation, a sufficient amount of the select shock reduction can be obtained.

Further, if the engine running speed $N_E$ is reduced by detaching the foot from the accelerator pedal during the time period K from the start of the abnormal start operation, the flag FLAG1 is maintained to be set. In this case, the fuel supply to all the cylinders is stopped by executing the step 176 when $3000 \text{ RPM} > N_E > 2500$ RPM, and the fuel supply to half the cylinders is stopped by executing the step 176 when $2500 \text{ RPM} \geq N_E > 2200$ RPM. In this manner, the engine output reduction control is performed optimally depending on a degree of the abnormal start operation. Also if the engine running speed $N_E$ becomes equal to or lower than 2200 RPM, the fuel supply to all the cylinders is restarted by the execution of the step 179, then only the clutch pressure reduction control and the gear position change control are performed, and the output torque of the automatic transmission is suddenly increased. In FIG. 9C, a solid curve D represents the case in which no control is performed upon the abnormal start condition.

In the present embodiment, the sensors for detecting the abnormal start operation, i.e. the engine running speed sensors 6-1, 6-2 and inhibitor switches 20-1, 20-2 are provide in a duplex manner, so that even if one of the engine speed sensors or one of the inhibitor switches becomes out of order, the most important control, i.e. the engine output reduction control is carried out without fail. It should be further noted that if the communication faculty between the engine control computer 5 and the transmission control computer 14 becomes out of order, at least the engine output reduction control is performed without fail. Therefore, the control apparatus according to the invention positively shows the fail-safe function.

In the above embodiment, if the one of the sensors on the transmission control computer 14 becomes out of order, the computer 14 sends the information of the abnormal start operation to the engine control computer 5 via the communication line 21 and then the engine control computer performs the given control for reducing the output power of the engine. In a modification of the present embodiment, upon the detection of the failure of a sensor on the transmission control computer 14, a signal detected by a corresponding sensor on the engine control computer 5 may be supplied to the transmission control computer 14 via the communication line 21, so that the transmission control computer may perform a given control by using the thus transmitted signal from the engine control computer 5. Then, it is possible to conduct all the predetermined controls for reducing the racing select shock.

FIG. 10 is a block diagram showing a second embodiment of the control apparatus according to the present invention. This embodiment is quite similar to that of the first embodiment explained above, so that portions similar to those of the previous embodiment are denoted by the same reference numerals used in FIG. 1. In the present embodiment, there are provided engine running speed sensor 6 for detecting the engine running speed $N_E$, vehicle running speed sensor 7 for detecting the vehicle running speed V, throttle sensor 8 for detecting the engine throttle opening $T_H$ and intake air sensor 9 for detecting the engine intake air quantity Q. The sensors 6, 7 and 8 are connected to both the engine control computer 5 and transmission control computer 14, and the sensor 9 is connected only to the engine control computer. There is further provided an inhibitor switch 20 for detecting a shift range of a manually operated shift lever 19 of the automatic transmission, and this inhibitor switch is connected to the transmission control computer 14. It should be noted that in the present embodiment, the sensors are not provided in a duplex manner. The remaining construction of the control apparatus of the present embodiment is same as that of the first embodiment, so that its detailed explanation is dispensed with. Also in the present embodiment, an engine 1 is an electronically controlled fuel-injection type engine having six cylinders. In the present embodiment, the engine control computer 5 receives two kinds of the engine torque reduction signals $T_{d1}$ and $T_{d2}$, and controls the fuel supply to zero, three, four or six cylinders as will be explained later.

FIG. 11 is a flow chart showing the control program of the control apparatus of the present embodiment. Also in the present embodiment, similar steps to those of the previous embodiment are represented by the same step number as those shown in FIG. 2. At first, the judgment of the failure of the shift solenoids 15a and 15b of the transmission 2 is carried out in the step 101. The judgment may be conducted entirely in the same manner as that of the first embodiment by using the checking circuit depicted in FIG. 8. If the failure of the solenoids has been detected, the flag FLAGH is set (FLAGH=1).

Then, in a step 102, it is judged whether or not a failure has occured in the duty solenoid 16 for controlling the line pressure in the automatic transmission, and if the failure has been detected, the flag FLAGP is set (FLAGP=1). Thereafter, in a step 103, a failure of the communication line 21 between the engine control computer 5 and the transmission control computer 14 is effected. If the failure is detected, the flag FLAGE is set (FLAGE=1). Next, in a step 105, it is judged whether or not the abnormal start operation is detected It should be noted that in the present embodiment, the sensors are not provided in a duplex manner, it is not necessary to detect a failure of the sensors connected to the transmission control computer 14, so that the step 104 in the previous embodiment is omitted.

Then, in a step 106, it is checked whether the FLAG1 has been set or not. If the FLAG1 has not been set (FLAG1=0, the control is ended without effecting any special operation. However, if the FLAG1 has been set, i.e. when the abnormal start operation has been detected, the conditions of the flags are checked in steps following 107.

In a step 107, it is judged whether the failure of the communication line 21 has been detected or not. If the FLAGE has been set, the torque reduction request signals $T_{d1}$ and $T_{d2}$ could not be sent from the transmission control computer 14 to the engine control computer 5 via the communication line 21, so that the engine output reduction control could not be performed. Therefore, if only the clutch pressure reduction control and gear position were proformed change into the second gear position, the racing select shock could not be reduced sufficiently. Then, in the present embodiment, in a step 108, the gear position is changed into the third gear position at which the output torque of the transmission is reduced to a value lower than that which is obtained at the gear position change into the second gear position as is the case of the previous embodiment. Next in a step 109, the clutch pressure PCL is reduced by a larger amount than that is attained by the normal control for reducing the clutch pressure by controlling the duty cycle of the driving signal for the duty solenoid 16. In this manner, in the present embodiment, when the failure is detected, the predetermined controls, i.e. the gear change control and clutch pressure reduction control are effected by changing the control characteristics of these controls in such a direction that the racing select shock is reduced.

When the communication line 21 operates normally (FLAGE=0), then in a step 110, it is judged whether the FLAGP has been set or not. If the duty solenoid 16 has been detected out of order (FLAGP=1), the gear position is changed into the third gear position in a step 111 by considering that if the gear is changed into the second gear position, the racing select shock could not be sufficiently reduced due to the failure of the duty solenoid 16 which controls the line pressure of the transmission 2. Further, in a step 112, the second torque reduction request signal $T_{d2}$ is supplied from the transmission control computer 14 to the engine control computer 5, said second torque reduction request signal $T_{d2}$ being effective to reduce the output power of the engine 1 by a larger amount than that which is obtained by the first torque reduction request signal $T_{d1}$.

When the duty solenoid 16 has been detected to work satisfactorily (FLAGP=0), then in a step 113, it is judged whether the FLAGH has been set or not. If the FLAGH has been set, i.e. when one of the shift solenoids 15a and 15b has been detected to be out of order, the clutch pressure PCL is reduced in a step 114 by a larger amount than that is attained in the normal control, so that the shortage in the reduction of the racing select shock due to the failure of the shift solenoid is compensated. Further, in a step 115, the second torque reduction request signal $T_{d2}$ is sent from the transmission control computer 14 to the engine control computer 5, and the output of the engine is reduced greatly.

When the shift solenoids 15a, 15b have been detected to be normal (FLAGH=0), then, in a step 116 the clutch pressure is reduced by a normal amount, in a step 117 the gear position is changed into the second gear position, and in a step 118 the first torque reduction request signal $T_{d1}$ is transmitted from the transmission control computer 14 to the engine control computer 5 via the communication line 21 and the output of the engine 1 is reduced by a usual amount.

FIG. 12 is a flow chart showing the control of the subroutine for setting the FLAG1 when the abnormal start operation is effected. This flow chart is quite similar to that illustrated in FIG. 6 of the previous embodiment, but in the present embodiment, since the failure of the sensors is not detected, the steps 151 and 152 in FIG. 6 are dispensed with. The remaining steps are entirely same as those of FIG. 6, and the FLAG1 is set for the predetermined period of time K only when the engine running speed $N_E$ exceeds the predetermined threshold value of 3000 RPM.

FIG. 13 is a flow chart illustrating the control of the subroutine for reducing the output power of the engine. This flow chart is similar to that shown in FIG. 7 of the first embodiment. At first, in a step 171, a failure in the communication line 21 between the engine control computer 5 and the transmission control computer 14 is detected in the same manner as that of the step 103 in FIG. 11. If no failure in the communication line 21 has been detected (FLAGE=0) in a step 172, then in a step 174, it is judged whether one of the first and second torque reduction request signals $T_{d1}$ and $T_{d2}$ is sent from the transmission control computer 14. If either one of the torque reduction request signals is sent from the computer 14, then in a step 175, it is judged whether or not the engine running speed $N_E$ exceeds 2500 RPM. If $N_E$ is higher than 2500 RPM, then in a step 176 the fuel supply to all the six cylinders of the engine 1 is stopped to decrease the engine output abruptly. If $N_E$ is equal to or lower than 2500 RPM, then in a step 177, it is further judged whether or not $N_E$ exceeds 2200 RPM. If $N_E$ exceeds 2200 RPM, then in a step 190 it is further checked whether or not the first torque reduction request signal $T_{d1}$ has been supplied from the transmission control computer 14. If the first torque reduction request signal has been received, then in a step 179 the fuel supply to half the six cylinders is stopped to reduce the engine output in a normal manner. But if the second torque reduction request signal $T_{d2}$ has been received, then in a step 191, the fuel supply to four cylinders is stopped to reduce the engine output much greater than the control in the step 179.

In the step 177, if it is judged that $N_E$ does not exceed 2200 RPM and if any one of the first and second torque reduction request signals $T_{d1}$ and $T_{d2}$ is not sent from the transmission control computer 14 to the engine control computer 5, it is not necessary to effect the control for reducing the engine output, because the starting operation is normal. Then, in a step 179 the fuel is supplied to all the six cylinders.

As explained above, in the second embodiment of the control apparatus according to the invention, when the abnormal start operation is detected, the clutch pressure reduction control and gear position changing control are performed under the normal operation of the control apparatus. But, when the failure is detected in the abnormal start operation, at least one of the clutch pressure reduction control and gear position changing control, i.e. a control which can be conducted without being affected by the failure, is performed by changing the control characteristics in such a direction that the racing select shock is decreased.

Upon the detection of the abnormal start operation in the condition of no failure, on the side of the engine control computer the fuel supply is stopped to all the six cylinders through the steps 171-172-174-175-176. At the same time, the output torque of the transmission 2 is reduced much more than the case in which only the engine output reduction control is performed or both the engine output reduction control and clutch pressure reduction control are carried out. Furthermore, when the failure is detected in the control apparatus, two of the above mentioned three controls which are not influenced by the failure can be performed by changing the control characteristics in such a manner that the racing select shock is reduced. In this manner, according to the present embodiment, the racing select shock can be effectively reduced even if the failure occurs in the control apparatus.

It should be noted that in the present embodiment, the reduction of the engine output is performed by the three stages depending on the engine running speed $N_E$. That is to say, the fuel supply to all the six cylinders is stopped for 3000 RPM $> N_E >$ 2500 RPM, and the fuel is supplied only two or three cylinders for 2500 RPM $\geq N_E >$ 2200 RPM. When $N_E$ becomes equal to or lower than 2200 RPM, either one of the clutch pressure reduction control and gear position control which works satisfactorily without being affected by the failure is performed, and thus the output torque of the transmission 2 can be increased abruptly.

As explained above, in the present embodiment, when one of the communication line 21, shift solenoids 15$a$, 15$b$ and duty solenoid 16 becomes out of order, two of the engine output reduction control, clutch pressure reduction control and gear position change control which are not affected by the failure, are performed by changing the control characteristics in such a direction that the racing select shock due to the abnormal start operation is decreased. In this manner, a desired fail-safe faculty can be attained.

In the above explained embodiments, the control apparatus according to the invention is applied to the unified control for the electronically controlled fuel-injection type engine and automatic transmission for the automotive vehicle, but the control apparatus can be equally applied to various control systems of the automotive vehicle by using various sensors such as vehicle running speed sensor and throttle opening sensor. Moreover, the present invention may be effectively applied to various control systems for controlling operations of various subjects other than the automotive vehicle.

What is claimed is:

1. A control apparatus with fail-safe faculty for controlling a driving power of an automotive vehicle including an electronically controlled engine and an automatic transmission having a torque converter, an automatic speed change gear mechanism, and a manual gear select control and a controllable variable torque transfer capacity clutch, comprising: sensing means including a plurality of sensors for detecting operational conditions of the vehicle and generating a corresponding plurality of detection signals;

judging means for processing said detection signals and generating an abnormal start signal when said detection signals have a predetermined state, said predetermined state indicating that an abnormal mechanical shock condition would occur when a driver effects a change of the manual gear select control of said speed change gear mechanism;

first controlling means for reducing an output power of the engine in response to said abnormal start signal; p1 second controlling means for reducing a transfer torque capacity of the variable torque transfer capacity clutch of said speed change gear mechanism of the automatic transmission in response to said abnormal start signal; and third controlling means for controlling said speed change gear mechanism of the automatic transmission in response to said abnormal signal such that a gear position is shifted into a predetermined gear position at which an output torque of the automatic transmission is lower than a value which is produced under a normal start operation;

a means for detecting a failure in one of said plurality of sensors of the sensing means; and means for controlling a predetermined one of said first, second and third controlling means in response to said detected failure to perform a predetermined control of one of an ouptut power of the engine, a transfer torque capacity of the variable torque transfer capacity clutch and a gear position of said speed change gear mechanism.

2. A control apparatus according to claim 1, wherein said first, second and third controlling means are constructed such that when said system failure occurs, at least one controlling means which may work correctly without being affected by said system failure is operated in addition to said predetermined controlling means.

3. A control apparatus according to claim 1, wherein said predetermined controlling means is the first controlling means for reducing the output power of the engine in response to the abnormal start signal.

4. A control apparatus according to claim 3, wherein said first controlling means is constructed such that in response to said abnormal start signal, the number of cylinders of the engine to which a fuel is supplied is reduced.

5. A control apparatus according to claim 4, wherein said first controlling means is constructed such that when the engine running speed is higher than a first value, the fuel supply to all the cylinders of the engine is stopped in response to said abnormal start signal, and when the engine running speed is not higher than said first value, but is higher than a second value, the fuel supply to half the cylinders is stopped in response to said abnormal start signal.

6. A control apparatus according to claim 5, wherein said first value is set to 2500 RPM and said second value is set to 2200 RPM.

7. A control apparatus with fail-safe faculty for controlling a driving power of an automotive vehicle including an electronically controlled fuel-injection type engine and an automatic transmission having a torque converter, an automatic speed change gear mechanism, and a manual gear select control, comprising:

sensing means including a plurality of sensors for detecting operational conditions of the automotive vehicle to generate detection signals;

judging means for processing said detection signals and generating an abnormal start signal when said detection signals have a predetermined state, said predetermined state indicating a predetermined abnormal mechanical shock condition would occur when a driver effects a change of a manual control of said speed change gear mechanism;

first controlling means for performing a first control in which an output power of the engine is reduced in response to said abnormal start signal;

second controlling means for performing a second control in which a clutch transfer torque capacity of said speed change gear mechanism of the automatic transmission is reduced in response to said abnormal start signal; and third controlling means for performing a third control in which said speed change gear mechanism of the automatic transmission is controlled such that a gear position is shifted in response to said abnormal start signal into a predetermined gear position at which an output torque of the automatic transmission becomes lower than a value which is produced under a normal start operation;

means for detecting a failure of one of said first, second and third controlling means and for generating a corresponding failure signal, wherein said first, second and third controlling means have a means for determining, in response to said failure signal, that one of said first, second and third controls can not be performed due to a system failure, and a means for performing the remaining two controls by a predetermined changing of operational characteristics of these two controls in response to said determining.

8. A control apparatus according to claim 7, wherein said first controlling means is constructed such that under no system failure, the fuel supply to all cylinders of the engine is stopped in response to said abnormal start signal when the engine running speed is higher than a first value, and the fuel supply to half the cylinders is stopped when the engine running speed is not higher than the first value, but is higher than a second value; and under the system failure, the fuel supply to all the cylinders of the engine is stopped in response to said abnormal start signal when the engine running speed is higher than the first value, and the fuel supply to two thirds the cylinders is stopped when the engine running speed is not higher than the first value, but is higher than the second value.

9. A control apparatus according to claim 8, wherein said first value is set to 2500 RPM and said second value is set to 2200 RPM.

10. A control apparatus according to claim 7, wherein said second controlling means is constructed such that said clutch transfer torque capacity is reduced in response to said abnormal start signal by reducing a line pressure of the speed change gear mechanism.

11. A control apparatus according to claim 10, wherein said line pressure is reduced to a first value when said abnormal start signal is generated under no system failure, and said line pressure is reduced to a second value which is lower than said first value when said abnormal start signal is produced under the system failure.

12. A control apparatus according to claim 11, wherein said line pressure is reduced by decreasing a duty cycle of a driving signal for a duty solenoid.

13. A control apparatus according to claim 7, wherein said third controlling means is constructed such that under no system failure, the gear position of the speed change gear mechanism of the automatic transmission is shifted into a second gear position in response to said abnormal start signal, and under the system failure, the gear position is shifted into a third gear position in response to the abnormal start signal.

14. A control apparatus with fail-safe faculty for controlling a driving power of an automotive vehicle including an electronically controlled fuel-injection type engine and an automatic transmission having a torque converter, an automatic speed change gear mechanism controlled by a manual select lever and a controllable variable torque transfer capacity clutch, comprising:

an engine control computer for performing a first control in which an output torque of the engine is reduced in response to an abnormal start operation signal;

a transmission control computer for performing a second control in which an output torque of the automatic transmission is reduced in response to the abnormal start operation signal;

a communication line connected between the engine control computer and the transmission control computer;

first and second engine running sensors for detecting the engine running speed ($N_E$) and connected to said engine control computer and transmission control computer, respectively;

first and second vehicle running speed sensors for detecting the vehicle running speed (V) and connected to said engine control computer and transmission control computer, respectively;

first and second inhibitor switches for detecting a range position (S) selected by said manual select lever and connected to said engine control computer and transmission control computer, respectively;

a throttle sensor for detecting a throttle opening ($T_H$) and connected parallely to said engine control computer and transmission control computer;

an intake air sensor for detecting an intake air quantity (Q) and connected to said engine control computer; and input and ouptut rotation speed sensors for detecting rotation speeds of input and output shafts, respectively, of the speed change gear mechanism and outputting an input and output rotation speed signal, respectively, to said transmission control computer;

means for detecting a failure of said second engine running speed sensor and generating a second engine running speed sensor failure signal in response thereto;

means for detecting a failure of said second inhibitor switch and generating a second inhibitor switch failure signal in response thereto;

wherein transmission control computer has means, in response to the concurrent absence of said second engine running speed sensor failure signal and said second inhibitor switch failure signal, for generating the abnormal start signal representing the abnormal start operation by processing the engine running speed ($N_E$) detected by said second engine running speed sensor and the range position (S) detected by said second inhibitor switch and for supplying said abnormal start signal to the engine control computer via said communication line to perform said first control, and wherein said transmission control computer has means for generating a system failure signal in response to one of said second engine running speed sensor failure signal and second inhibitor switch failure signal, and means for supplying said system failure signal to said engine control computer, and wherein said engine control computer has means for generating, in response to said system failure signal, the abnormal start signal by processing the engine running speed ($N_E$) detected by said first engine running speed sensor and the range position (S) detected by said first inhibitor switch to perform the first control.

15. A control apparatus according to claim 14, wherein said engine control computer and transmission control computer have a means for detecting a failure of said communication line and, said engine control computer has means for performing, in response to said detected failure, said first control in response to the abnormal start signal generated by the engine control computer, and said transmission control computer has a means for performing, in response to the detected failure of said communication line, said second control in response to the abnormal start signal generated by the transmission control computer.

16. A control apparatus according to claim 15, wherein said engine control computer has a means for performing said first control by reducing the number of cylinders of the engine to which a fuel is supplied.

17. A control apparatus according to claim 16, wherein said engine control computer has a means for responding to the abnormal start signal in the absence of the system failure signal by stopping the fuel supply to all of the cylinders of the engine in response to said abnormal start signal when the engine running speed ($N_E$) is higher than a first value, and by stopping the fuel supply to half of the cylinders when the engine running speed $N_E$ is not higher than the first value but is higher than a second value.

18. A control apparatus according to claim 17, wherein said first value is set to 2500 RPM and said second value is set to 2200 RPM.

19. A control apparatus according to claim 15, wherein said transmission control computer has a means for performing said second control by decreasing the clutch transfer torque capacity of the speed change gear mechanism in response to said abnormal start signal and by shifting the gear position of the speed change gear mechanism in response to said abnormal start signal into a predetermined gear position, said predetermined gear position being such that a starting operation output torque of the automatic transmission is lower at said predetermined gear position than a value which is produced under a start operation in the absence of the abnormal start signal.

20. A control apparatus according to claim 19, wherein said transmission control computer is constructed such that said gear position is shifted into a second gear position in response to the abnormal start signal.

21. A control apparatus according to claim 19, wherein said transmission control computer is constructed such that the clutch transfer torque capacity is reduced in response to said abnormal start signal by reducing a line pressure of the speed change gear mechanism.

22. A control apparatus according to claim 21, wherein said line pressure is reduced by decreasing a duty cycle of a driving signal for a duty solenoid.

23. A control apparatus with fail-safe faculty for performing a plurality of controls upon a subject, comprising:

sensing means including at least a first sensor for detecting an operational condition of the subject and generating a corresponding first detection signal, and a second sensor for detecting the same operational condition as detected by said first sensor and generating a corresponding second detection signal;

controlling means having a first control circuit connected to said first sensor for receiving said first detection signal therefrom and for producing a first control signal in response thereto, and a second control circuit for receiving said second detection signal therefrom and for producing a second control signal in response thereto;

actuating means having a first actuator for performing a first control for said subject in response to said first control signal, and a second actuator for performing a second control for said subject in response to said second control signal, said second control being different from said first control;

means for detecting a failure of said first sensor and for detecting a failure of said second sensor, and for outputting a sensor failure signal in accordance with a corresponding detected sensor failure; and signal communicating means for transmitting said first and second detection signals between the first and second control circuits, said signal communicating means having a means responsive to said sensor failure signal for transmitting, to the one of the first and second control circuits connected to the one of the first and second sensors indicated by said failure signal to have a detected failure, the other of said first and second sensor detection signals, wherein said first and second control circuits have a means for controlling said first and second actuators, respectively, in a first predetermined failure control in response to said failure signal, and a means for controlling at least one of said first and second actuators to perform at least one of said first and second controls when controlling said first and second actuators in said first predetermined failure control, and said first and second circuits have a means for detecting a failure of said signal communication means and, in response to said detected failure, for controlling at least one of said first and second actuators to perform a second predetermined failure control.

* * * * *

UNITED STATES PATENT AND TRADEMARK OFFICE
CERTIFICATE OF CORRECTION

PATENT NO. : 5,216,938

DATED : June 8, 1993

INVENTOR(S) : Hiroshi Yamaguchi

It is certified that an error appears in the above-identified patent and that said Letters Patent is hereby corrected as shown below:

On the title page, item:

[73] Assignee: Change "Nissan, Yokohama, Japan" to --Nissan Motor Co., Ltd., Yokohama, Japan--.

Signed and Sealed this

Ninth Day of August, 1994

Attest:

BRUCE LEHMAN

Attesting Officer

Commissioner of Patents and Trademarks